United States Patent [19]

Glass

[11] Patent Number: 5,535,307
[45] Date of Patent: Jul. 9, 1996

[54] PRINTING OF VARIABLE DOT SIZES DEPENDENT UPON IMAGE DENSITY FOR IMPROVED GRAPHICS

[75] Inventor: Stephen K. Glass, San Diego, Calif.

[73] Assignee: Hewlett-Packard Company, Palo Alto, Calif.

[21] Appl. No.: 291,230

[22] Filed: Aug. 16, 1994

[51] Int. Cl.⁶ .................................................. G06K 15/00
[52] U.S. Cl. ........................ 395/108; 395/114; 395/109
[58] Field of Search ....................................... 395/108, 109, 395/112, 115, 117, 114

[56] References Cited

U.S. PATENT DOCUMENTS

| | | | |
|---|---|---|---|
| 4,193,092 | 3/1980 | Stoffel | 358/136 |
| 4,437,122 | 3/1984 | Walsh et al. | 358/166 |
| 4,847,641 | 7/1989 | Tung | 346/154 |
| 4,967,203 | 10/1990 | Doan et al. | 346/1.1 |
| 5,062,724 | 11/1991 | Iizuka | 400/121 |
| 5,149,212 | 9/1992 | Murakami | 400/121 |
| 5,193,008 | 3/1993 | Frazier et al. | 358/298 |
| 5,205,660 | 4/1993 | Momose | 400/304 |
| 5,207,517 | 5/1993 | Ito | 400/121 |
| 5,270,728 | 12/1993 | Lund et al. | 346/1.1 |
| 5,289,564 | 2/1994 | Monimoto et al. | 395/109 |
| 5,327,260 | 7/1994 | Shimomae et al. | 358/448 |
| 5,355,231 | 10/1994 | Murata | 358/443 |
| 5,361,329 | 11/1994 | Monta et al. | 395/102 |
| 5,387,985 | 2/1995 | Luce et al. | 358/455 |

FOREIGN PATENT DOCUMENTS

| | | |
|---|---|---|
| 0220568 | 5/1987 | European Pat. Off. . |
| 3546136 | 6/1986 | Germany . |

*Primary Examiner*—Mark R. Powell
*Assistant Examiner*—Tracy M. Legree

[57] ABSTRACT

The present invention improves the quality of halftone graphics patterns which convey shades of gray using dots. In the preferred embodiment, an initial low resolution graphics pattern is translated into a higher resolution graphics pattern by printing a variable number of high resolution dots for each dot in the low resolution graphics pattern. The number of high resolution dots printed for each initial low resolution dot is dependent upon the density of dots in the low resolution pattern. In another embodiment, the size of each dot printed, rather than the number of dots, is varied depending upon the density of dots in the low resolution pattern. When the dot density increases to where the low resolution pattern appears to be part of a text pattern, a different set of enhancement rules are then applied to correct the text pattern. Using the above method, an enhanced high resolution graphics pattern may be produced from a lower resolution graphics pattern without objectionable clumping of dots, thus producing a more homogenous and pleasing graphics pattern.

20 Claims, 2 Drawing Sheets

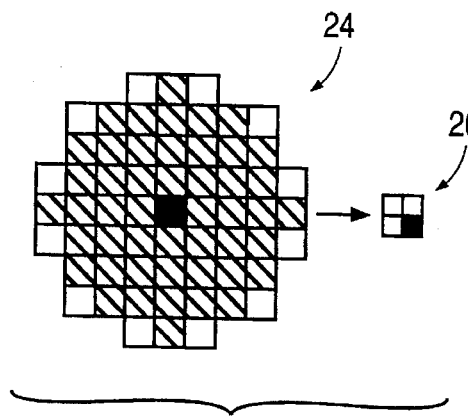 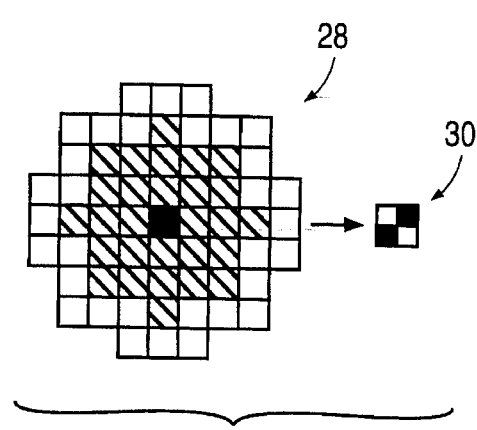
FIG. 3  FIG. 4
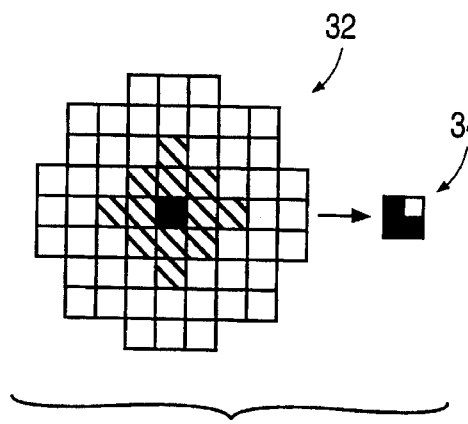 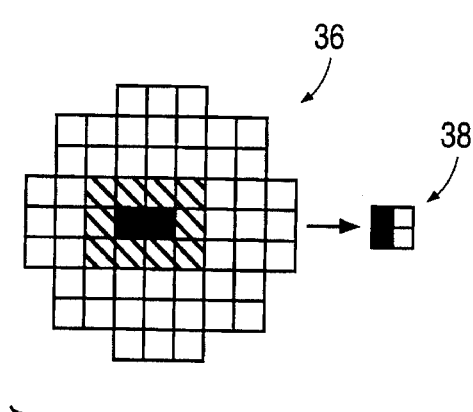
FIG. 5  FIG. 6
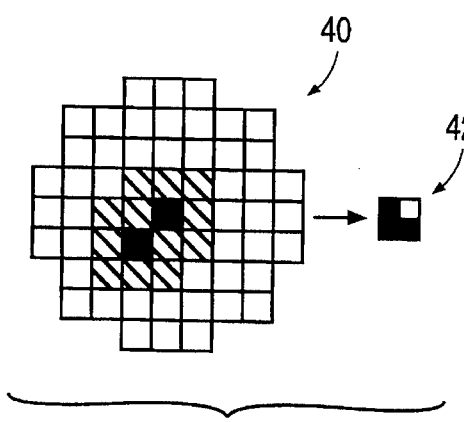 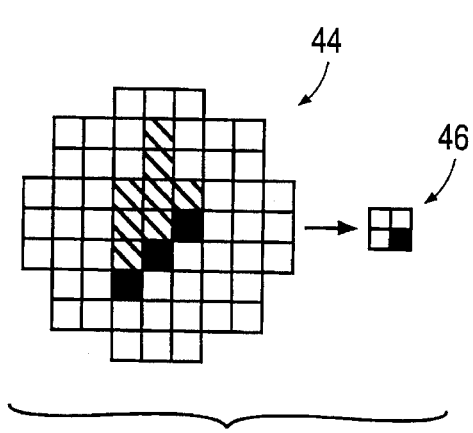
FIG. 7  FIG. 8

PRINTING OF VARIABLE DOT SIZES DEPENDENT UPON IMAGE DENSITY FOR IMPROVED GRAPHICS

FIELD OF THE INVENTION

This invention relates to an enhancement system for improving the quality of a graphics pattern when printed or otherwise displayed.

BACKGROUND OF THE INVENTION

Existing resolution enhancement schemes improve text quality by using algorithms or look-up tables which determine whether an initial text pattern stored in a memory should be modified to correct for quantization limits. This determination of whether an initial text pattern should be modified requires a prior knowledge of acceptable text patterns usually found in alphanumeric text. The correction scheme then modifies the initial text pattern according to a set of rules. The corrected and now more pleasing text pattern is then printed or otherwise displayed at a higher resolution than the initial text pattern stored in the memory. Such resolution enhancement techniques may be performed by circuitry residing in a high resolution printer.

The above enhancement scheme, which provides smoother edges by reducing quantization errors, is not as effective on graphics, since the quality of many graphics patterns is dependent on the quality of the halftone patterns making up the graphics pattern rather than on any edges in the graphics pattern. Thus, these graphics patterns are usually not changed from their initial form.

It is understood that a low resolution halftone graphics pattern presents a coarser and less pleasing halftone pattern than a high resolution graphics pattern. However, a high resolution pattern created by simply printing each dot of a low resolution graphics pattern as a fixed number of smaller, high resolution dots (i.e., a cluster of dots) would still contain equivalent quantization errors and present a coarse halftone pattern.

What is needed is a graphics enhancement scheme to improve the quality of a low resolution graphics pattern when printed by a higher resolution printer.

SUMMARY

The present invention improves the quality of halftone graphics patterns which convey shades of gray using dots. In the preferred embodiment, an initial low resolution graphics pattern is translated into a higher resolution graphics pattern by printing a variable number of high resolution dots for each dot in the low resolution graphics pattern. The number of high resolution dots printed for each initial low resolution dot is dependent upon the density of dots in the low resolution pattern.

Assuming the low resolution pattern is a 300 dots per inch (dpi) pattern and is desired to be printed at a higher resolution of 600 dpi, then a maximum of four high resolution dots can be printed for each low resolution dot. In the preferred embodiment, dots in the low resolution pattern conveying a light gray level will be translated into only a single high resolution dot. As the dot density increases in the low resolution pattern to form darker levels of gray, two or three dots will be printed by the high resolution printer for each low resolution dot. When the dot density increases to where the low resolution pattern appears to be part of a text pattern, a different set of enhancement rules are then applied to correct the text pattern.

Using the above method, an enhanced high resolution graphics pattern may be produced from a lower resolution graphics pattern without objectionable clumping of dots, thus producing a more homogenous and pleasing graphics pattern.

In another embodiment, the size of each dot printed, rather than the number of dots, is varied depending upon the density of dots in the low resolution pattern. Thus, in this case the printed resolution will be the same as the initial resolution.

BRIEF DESCRIPTION OF THE DRAWINGS

FIG. 3 illustrates a rule pattern which translates a central low resolution dot in a very light gray initial pattern to a single dot of twice the resolution.

FIG. 4 illustrates a rule pattern which translates a central low resolution dot in a light gray initial pattern to two dots of twice the resolution.

FIG. 5 illustrates a rule pattern which translates a central low resolution dot in a medium gray initial pattern to three dots of twice the resolution.

FIGS. 6 and 7 illustrate rule patterns which translate a central low resolution dot adjacent to another dot in a light or medium gray initial pattern to three dots of twice the resolution.

FIG. 8 illustrates one example of a rule pattern for text which corrects for quantization errors in a diagonal line.

DETAILED DESCRIPTION OF THE PREFERRED EMBODIMENT

The preferred embodiment will be described using the example of an initial graphics pattern having a resolution of 300 dots per inch (dpi) being enhanced for printing at 600 dpi.

Figure 1:
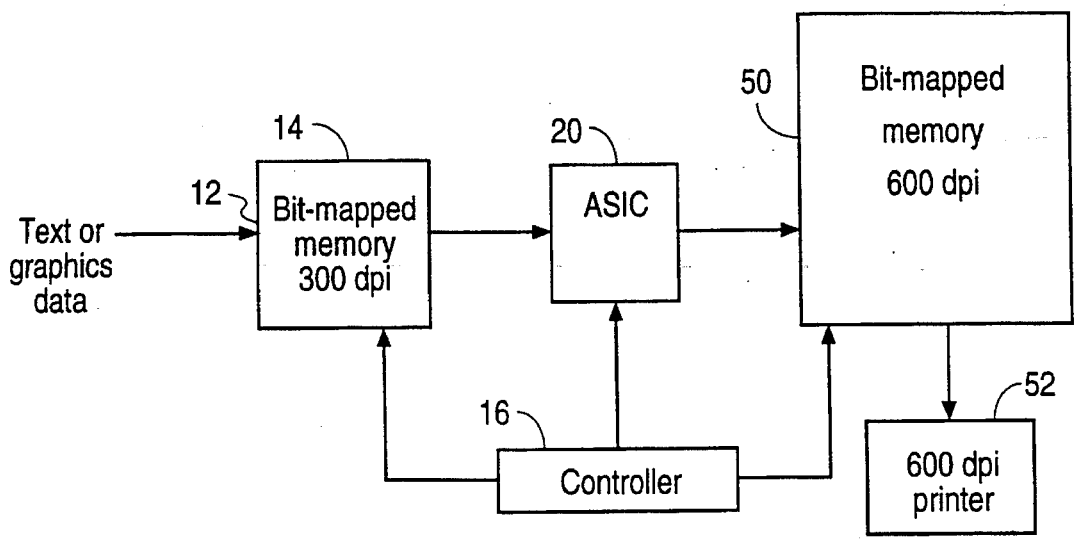
FIG. 1 is a block diagram illustrating one embodiment of a circuit for carrying out the preferred embodiment of the invention.

FIG. 1 illustrates a circuit which may be incorporated into a 600 dpi printer or any 600 dpi display device. A host processor (not shown) generates text or graphics data intended for printing at 300 dpi. This text or graphics data is suitably converted from its original ASCII or other format into a pattern of bits corresponding to dots to be printed at 300 dpi. This pattern of bits is applied to an input terminal 12 of a bit-mapped memory 14. The arrangement of bits stored in bit-mapped memory 14 corresponds to the pattern of dots to be printed at 300 dpi. The required minimum size of bit-mapped memory 14 will depend on the buffering required for the system.

Figure 2:
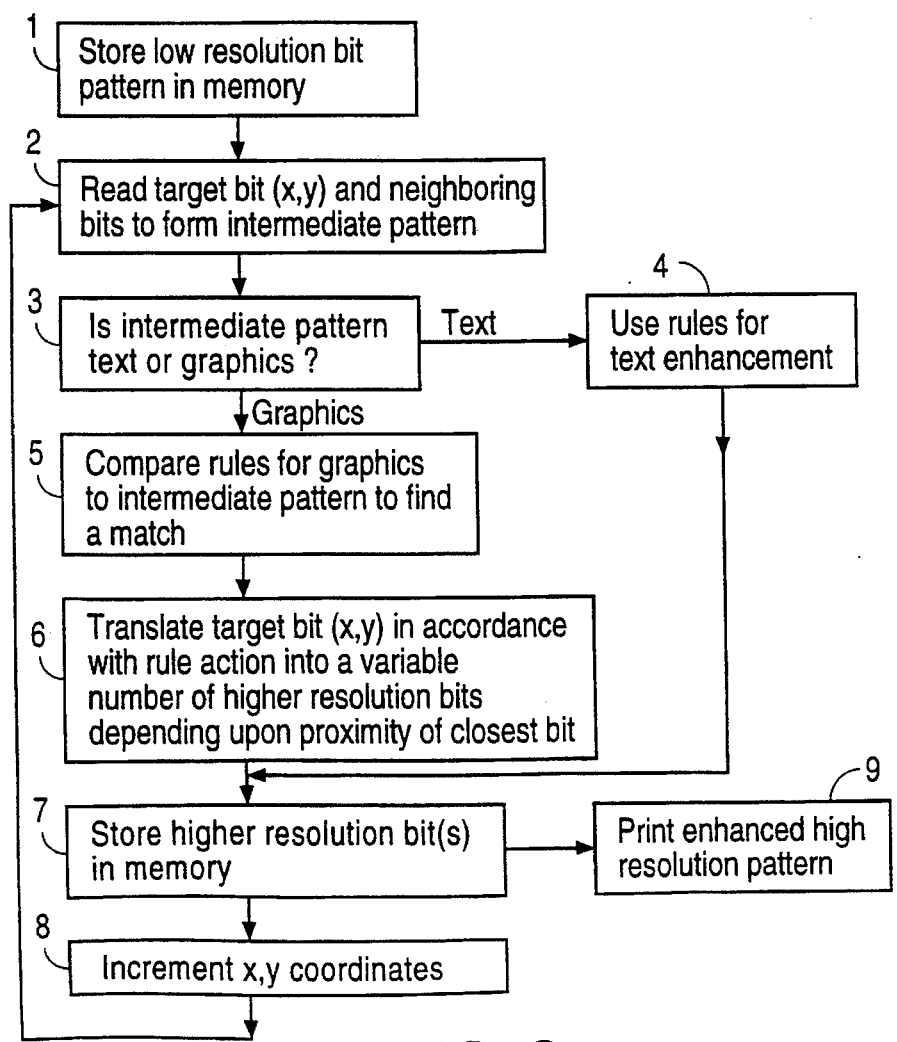
FIG. 2 is a flow chart summarizing various steps used in the preferred embodiment method.

The step of storing a low resolution bit pattern in memory 14 is shown as step 1 in the flow chart of FIG. 2.

A controller 16, under the control of a software program, controls bit-mapped memory 14 to read and write bits as required. Control circuitry for such a memory 14 is well known and will not be described herein in detail.

After an initial pattern of bits is stored in bit-mapped memory 14, controller 16 controls memory 14 to output a small block of bits stored in bit-mapped memory 14. This block of bits will be referred to as an intermediate pattern.

The intermediate pattern contains a central bit (or target bit), with coordinates (x,y), and its neighboring bits. In one embodiment, this intermediate pattern is an array of 9×9 bits with the center bit being the low resolution target bit for enhancement by the system of FIG. 1.

The step of outputting an intermediate pattern is identified as step 2 in FIG. 2.

This intermediate pattern is then compared to a set of rules stored in an ASIC 20. ASIC 20 first determines whether the intermediate pattern is part of a graphics pattern or part of alphanumeric text. This determination may be performed in a number of ways, one way being to determine whether the intermediate pattern contains a clump of dots or a band of dots (e.g., three or more adjacent dots) which is consistent with a pattern of dots forming a portion of an alphanumeric character. Such a determination may simply be made by comparing the dot pattern in the intermediate pattern with one or more rule patterns containing threshold patterns of dots, below which the intermediate pattern is considered to be a portion of a graphics pattern and above which the intermediate pattern is considered to be a portion of a text pattern. If the intermediate pattern is determined to be text, then this intermediate pattern is enhanced by comparing the pattern with a set of rules tailored for text only. If the intermediate pattern is considered to be a portion of a graphics pattern, then the process will proceed as described below.

The step of determining whether the intermediate pattern is text or graphics is shown as step 3 in FIG. 2. Applying the rules and taking the required actions for enhancing the detected text pattern are illustrated as step 4 in FIG. 2.

The terms bit and dot will sometimes be used interchangeably in this disclosure for simplicity to convey a bit in the intermediate pattern or enhanced pattern representing a printed black (or other nonwhite) dot.

The rules stored in ASIC 20 for graphics patterns are then compared to the intermediate pattern to find a match between the intermediate pattern and the rules. Step 5 in FIG. 2 identifies this step. Examples of such rules are shown in FIGS. 3–7. The single black dot in the middle of the rule patterns of FIG. 3–7 corresponds to a center black dot (or equivalent bit) in the intermediate pattern. If the intermediate pattern contains no central bit representing a dot, no enhancement of this "white dot" is made. The other black dots (shown as black squares) in the rule patterns of FIGS. 3–7 correspond to those dots in the intermediate pattern which must be black for the rule to apply to that intermediate pattern. The shaded bit positions in the rule patterns correspond to those dots in the intermediate pattern which must be white for the rules to apply to that intermediate pattern. The white squares in the rule patterns correspond to dots in the intermediate pattern which are "don't cares" (either black or white).

When an intermediate pattern is detected which corresponds to a particular rule pattern, the center black dot in the intermediate pattern is translated into one, two, or three dots, depending upon the rule pattern. This assumes that the graphics pattern is translated from a low resolution pattern (e.g., 300 dpi) to double the resolution (e.g., 600 dpi), where a single dot area in the low resolution pattern corresponds to four dot areas in the high resolution pattern.

The rule pattern 24 and rule action 26 illustrated in FIG. 3 represent a situation where a single black dot in the center of the intermediate pattern is relatively isolated, as is the case when the dot is part of a very light gray halftone pattern. In such very light gray patterns, the coarseness of the dot pattern is most noticeable, since the low resolution dots are relatively large compared to the average distance between dots. If rule pattern 24 matched the intermediate pattern, the central dot (x,y) of the intermediate pattern would be translated into one high resolution dot, as shown by the rule action 26, where the effective size of the single dot in rule action 26 is approximately one-fourth the size of the low resolution dot corresponding to the central bit in the intermediate pattern.

The rule pattern 28 and rule action 30 illustrated in FIG. 4 represents a situation where dots in the intermediate pattern are placed closer together. When an intermediate pattern matches rule pattern 28, two high resolution dots are printed instead of the single low resolution dot in the center of the intermediate pattern. In the preferred embodiment, the two high resolution dots are printed diagonally since this diagonal correlation is less noticeable than a vertical or horizontal correlation.

It should be noted at this junction that if an intermediate pattern matches two or more rule patterns, the rule pattern representing a lighter gray scale level would apply. Accordingly, in one embodiment, the rule patterns are assigned hierarchies in the event that an intermediate pattern matches two or more rule patterns.

FIG. 5 illustrates a rule pattern 32 and rule action 34 which apply when the dots in the intermediate pattern are more densely distributed. When there is a match between the intermediate pattern and rule pattern 32, the central dot of the intermediate pattern is translated into three high resolution dots as shown by rule action 34.

In low resolution graphic patterns, two adjacent dots may start appearing at fairly light gray scale levels. Examples of rule patterns and rule actions which take into account these adjacent dots are illustrated in FIGS. 6 and 7 as rule pattern 36/action 38 and rule pattern 40/action 42. As seen, the central dot in the intermediate pattern is replaced by two high resolution dots in accordance with the rule action 38 and three dots in accordance with the rule action 42. The rule patterns 36 and 40 of FIGS. 6 and 7 are illustrative of such rule patterns and other rule patterns for adjacent dots would include, but not be limited to, patterns identical to FIGS. 6 and 7 but rotated at 90° intervals.

The particular rule patterns and rule actions programmed into ASIC 20 would depend upon the resolution of the initial pattern, the resolution of the printer/display used, the particular type of printing mechanism used (e.g., inkjet, laser, etc.), the ink bleed expected, and other factors which affect the resolution of a printed image. One skilled in the art would understand how to create and modify the various rule patterns and rule actions to generate high resolution patterns which are most pleasing. Such generation of optimized rule patterns/actions may be determined empirically.

Step 6 in FIG. 2 identifies the above step of translating the central dot (or bit) of the intermediate pattern into a variable number of higher resolution dots depending upon the proximity of the central dot to neighboring dots.

In one embodiment, controller 16 is a conventional microprocessor and ASIC 20 is a Hewlett-Packard ASIC model 1TY8-0001. ASIC 20 is hard-wired with its particular set of rule patterns and rule actions as would be understood by those skilled in the art.

Once the enhanced high resolution bit pattern (illustrated by rule actions 26, 30, 34, 38, and 42) is generated by ASIC 20, the bits in this high resolution bit pattern are then stored in corresponding locations in a bit-mapped memory 50. Assuming the high resolution pattern is double the dpi of the initial low resolution pattern, bit-mapped memory 50 must store four times as many bits as bit-mapped memory 14. Although memories 14 and 50 are shown as separate memories, these memories may constitute portions of a single RAM and may even overlap where appropriate to conserve memory space. The step of storing the high resolution bit pattern into bit-mapped memory 50 is shown as step 7 in FIG. 2.

The high resolution bit pattern to be stored in memory 50 may instead be generated by a suitable rule action for text, as shown in step 4, if the intermediate pattern was determined to be a portion of text in step 3.

In step 8, a next intermediate pattern is then outputted from bit-mapped memory 14 by simply incrementing the coordinates for the central bit of the intermediate pattern. The process illustrated in FIG. 2 is then repeated until all the bits in bit-mapped memory 14 have been processed.

The high resolution bit pattern stored in bit-mapped memory 50 can be printed (step 9) at any time by a suitable high resolution printer 52, which prints a single black dot for each corresponding bit in the bit-mapped memory 50.

Controller 16 controls the operation of memories 14 and 50 and ASIC 20 in a manner which would be understood by those skilled in the art after reading this disclosure.

In the preferred embodiment, the rule patterns for enhancing graphic patterns are only applied when there is no more than one dot adjacent the central dot in the intermediate pattern. This is because it is not desired to interfere with the rules for text and because the advantages of the present invention are most apparent when used to print light gray halftone patterns.

An example of a rule pattern and rule action for text (implemented in step 4 of FIG. 2) is shown in FIG. 8, where the rule pattern 44 and resulting rule action 46 apply to an intermediate pattern having a white dot as the central dot of the intermediate pattern and having a diagonal string of black dots as shown in rule pattern 44. The resulting high resolution dot pattern, illustrated by rule action 46, consists of a single black dot in the bottom right hand corner of the high resolution pattern to effectively smooth out the stepped diagonal line of black dots shown in rule pattern 44. Many different rule patterns and rule actions for text to smooth lines and edges and eliminate spurious bits would be also contained in ASIC 20.

The method discussed above varies the number of dots printed or displayed based on the proximity of dots to a central or target dot in the intermediate pattern. Another implementation would be to continually calculate the overall average density of some defined region around the central dot in the intermediate pattern and to generate a number of high resolution dots (e.g., 1, 2, or 3 dots) based on that density. Such a density calculation may be performed by dividing the total number of black dots in the intermediate pattern by the number of possible dots and comparing that ratio to various thresholds for generating 1, 2, or 3 high resolution dots. While this type of implementation may be more computationally intensive, there may be benefits in its ability to create smoother gradient patterns.

As there are different methods to determine dot density, likewise, there are different methods for creating variable dot sizes. The method discussed above modulates dot size by varying the number of high resolution dots printed. Another implementation would be to vary the size of each dot printed rather than change the resolution of the image. These dots of varying size should have areas equal to one, two, or three of the individual high resolution dots shown by rule actions 26, 30, 34, 38, and 42.

Although the preferred embodiment has been described using as an example an initial 300 dpi pattern being transformed into a 600 dpi pattern, the final resolution may be greater than double the existing resolution, or the final resolution may even be the same as the initial resolution. The number or size of dots in the resulting pattern would, of course, be adjusted based upon the ratio of the initial and final resolutions of the dot patterns. For example, if the final resolution were three times the initial resolution, a maximum of nine dots would be printed for each original dot. Also, the target dot in the intermediate pattern for translation need not be the central dot in the intermediate pattern but can be any dot in the intermediate pattern whose neighboring dots can be detected.

Further, each bit in the intermediate pattern need not coincide with a single dot to be printed or displayed. A single dot may be represented by a number of bits (e.g., a byte) in the intermediate pattern to convey a dot color or other information. In such a case, the required number of bits to convey the necessary dot information would be stored in the bit-mapped memory 50 for each high resolution dot.

The above-described methods enable graphic patterns to be rendered at higher resolutions than their original form. Thus, by printing an enhanced high resolution dot pattern while the original graphics pattern is generated using low resolution timing and circuitry, smaller memories and slower data transmission can be used to generate the original graphics pattern. Further, because not all software applications will support rendering graphics at the highest resolution of some printers, the above method will enhance the displayed output of those software applications without any modification to the applications.

This method may be equally used for displaying a high resolution pattern on a CRT or other display screen instead of printing using an ink printer.

While particular embodiments of the present invention have been shown and described, it would be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for enhancing an initial graphics pattern, said initial graphics pattern comprising a pattern of dots, said method comprising the steps of:

storing said initial graphics pattern as a pattern of bits in first memory locations, one or more of said bits corresponding to a single dot in said initial graphics pattern;

outputting a subset of said initial graphics pattern from said first memory locations to create an intermediate pattern, said intermediate pattern containing one or more target bits representing one or more target dots in said initial graphics pattern for enhancement and containing bits representing dots neighboring said one or more target dots in said initial graphics pattern;

determining whether said intermediate pattern matches a rule pattern, said rule pattern being one of a plurality of rule patterns;

applying at least one rule action from a plurality of rule actions to said intermediate pattern, based on a match between a bit pattern in said intermediate pattern and a rule pattern, to modify said one or more target bits in said intermediate pattern to create an enhanced pattern of bits, said rule action being based upon a density of dots represented in said intermediate pattern;

storing said enhanced pattern of bits in second memory locations; and displaying an enhanced pattern of dots corresponding to said enhanced pattern of bits.

2. The method of claim 1 further comprising the steps of:

receiving signals representing an initial text pattern or an initial graphics pattern, prior to said step of storing, wherein said step of storing said initial graphics pattern further comprises storing said initial text pattern as a pattern of bits in said first memory locations, depending on whether said signals convey text data or graphics data;

determining whether said intermediate pattern is part of a graphics pattern or a text pattern, prior to said step of determining whether said intermediate pattern matches a rule pattern; and comparing a detected text pattern to a first set of rule patterns and comparing a detected graphics pattern to a second set of rule patterns.

3. The method of claim 2 wherein said step of determining whether said intermediate pattern is part of a graphics pattern or a text pattern comprises the steps of determining whether there are three or more adjacent dots in said intermediate pattern and, upon such determination, determining that said intermediate pattern is part of a text pattern.

4. The method of claim 1 wherein said density of dots represented in said intermediate pattern is determined by detecting the proximity of one or more dots represented in said intermediate pattern to one or more target dots for enhancement, represented by said one or more target bits in said intermediate pattern.

5. The method of claim 1 wherein said density of dots represented in said intermediate pattern is determined by calculating a density of dots represented in said intermediate pattern.

6. The method of claim 1 wherein a resolution of said initial graphics pattern is lower than a resolution of said enhanced pattern.

7. The method of claim 6 wherein the resolution of said enhanced pattern is at least twice that of the resolution of the initial graphics pattern.

8. The method of claim 1 wherein said step of displaying an enhanced pattern of dots comprises printing said enhanced pattern of dots.

9. The method of claim 1 wherein said step of displaying an enhanced pattern of dots comprises displaying said enhanced pattern of dots on a display screen.

10. The method of claim 1 wherein said initial graphics pattern is initially stored as a pattern of bits in a bit-mapped memory.

11. The method of claim 1 wherein said one or more target bits represent one or more dots in said intermediated pattern which are centrally located in said intermediate pattern.

12. The method of claim 1 wherein said intermediate pattern corresponds to an array of dots in said initial graphics pattern.

13. A circuit for enhancing dot patterns to be printed or otherwise displayed, said circuit comprising:

a memory for storing an initial pattern of bits representing an initial pattern of dots to be printed or otherwise displayed;

means for outputting a subset of said data stored in said memory, said subset representing an intermediate pattern of dots;

means for determining whether said intermediate pattern is part of a text pattern or a graphics pattern;

means for comparing said intermediate pattern to a first set of rule patterns if said intermediate pattern is determined to be part of a graphics pattern and for comparing said intermediate pattern to a second set of rule patterns if said intermediate pattern is determined to be part of a text pattern;

applying at least one rule action from a plurality of actions to said intermediate pattern, based upon a match between said intermediate pattern and a rule pattern within said first set of rule patterns, to modify one or more target dots in said intermediate pattern to create an enhanced pattern of dots, said rule action being based upon a density of dots represented in said intermediate pattern; and a memory for storing an enhanced pattern of bits representing said enhanced pattern of dots.

14. The circuit of claim 13 further comprising a display means coupled to display said enhanced pattern of dots.

15. The circuit of claim 14 wherein said display means is a printer.

16. The circuit of claim 14 wherein said display means is a display screen.

17. The circuit of claim 13 wherein said means for determining whether said intermediate pattern forms part of a text pattern or a graphics pattern and said means for comparing is a programmed ASIC.

18. The circuit of claim 13 wherein said memory for storing said initial pattern of bits and said memory for storing said enchanced pattern of bits are bit-mapped memories.

19. The circuit of claim 18 wherein said bit-mapped memories form part of a single memory unit.

20. The circuit of claim 13 wherein a resolution of said initial pattern of dots is lower than a resolution of said enhanced pattern of dots.

* * * * *